United States Patent
Wrzesinski, II et al.

(10) Patent No.: US 11,326,663 B2
(45) Date of Patent: May 10, 2022

(54) DAMPER ASSEMBLY AND A PISTON FOR A DAMPER ASSEMBLY

(71) Applicant: BeijingWest Industries Co., Ltd., Beijing (CN)

(72) Inventors: Jakub Wrzesinski, II, Cracow (PL); Pawel Slusarczyk, Cracow (PL); Robert Kapolka, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 16/867,553

(22) Filed: May 5, 2020

(65) Prior Publication Data
US 2020/0355239 A1 Nov. 12, 2020

Related U.S. Application Data

(60) Provisional application No. 62/844,008, filed on May 6, 2019.

(30) Foreign Application Priority Data

Apr. 28, 2020 (CN) .......................... 202010348682.0

(51) Int. Cl.
*F16F 9/36* (2006.01)
*F16F 9/348* (2006.01)
*F16F 9/02* (2006.01)

(52) U.S. Cl.
CPC .......... *F16F 9/3484* (2013.01); *F16F 9/0227* (2013.01); *F16F 9/368* (2013.01);
(Continued)

(58) Field of Classification Search
CPC ........ F16F 9/368; F16F 9/3214; F16F 9/3482; F16F 9/3488; F16F 9/3278; F16F 9/0277; F16J 1/005; F16J 15/164
(Continued)

(56) References Cited

U.S. PATENT DOCUMENTS

| 3,706,362 A | 12/1972 | Faure | |
|---|---|---|---|
| 4,497,394 A * | 2/1985 | Ferrand | F16F 9/34 188/282.8 |
| 5,078,239 A * | 1/1992 | Kobayashi | F16F 9/466 188/266.7 |

(Continued)

FOREIGN PATENT DOCUMENTS

| CN | 102574440 A | 7/2012 |
|---|---|---|
| CN | 104696420 | 6/2015 |

(Continued)

OTHER PUBLICATIONS

First Office Action and search report dated May 7, 2021 for counterpart Chinese patent application No. 202010348682.0, along with EN translation.

(Continued)

*Primary Examiner* — Thomas J Williams
(74) *Attorney, Agent, or Firm* — William H. Honaker; Dickinson Wright PLLC (57) ABSTRACT

A damper assembly comprises a housing disposed on a center axis and defining a fluid chamber for containing a working fluid. A piston is slidably disposed in the fluid chamber dividing the fluid chamber into a compression chamber and a rebound chamber. A piston rod attaches to the piston for moving the piston in the housing. The piston includes a first portion and a second portion defining a first perforation. An outer sleeve has an exterior surface and an interior surface and extends between the first portion and the second portion covering the first perforation. The piston includes a first entry valve and a second entry valve located in the piston and coupled to the piston for limiting the working fluid from flowing into the piston with the first entry valve being disposed adjacent the first portion and the second entry valve being disposed adjacent the second portion.

18 Claims, 7 Drawing Sheets

FIG. 7

(52) U.S. Cl.
CPC ..... *F16F 2222/126* (2013.01); *F16F 2232/08* (2013.01); *F16F 2238/04* (2013.01)

(58) Field of Classification Search
USPC .......................... 188/322.18, 322.22; 92/185
See application file for complete search history.

(56) References Cited

U.S. PATENT DOCUMENTS

| | | | |
|---|---|---|---|
| 5,129,488 A | 7/1992 | Furuya et al. | |
| 5,248,014 A | 9/1993 | Ashiba | |
| 5,615,756 A | 4/1997 | Grundei et al. | |
| 6,481,336 B2 * | 11/2002 | May ...................... | F04B 53/143 188/322.18 |
| 7,395,907 B2 | 7/2008 | De Kock et al. | |
| 7,469,776 B2 | 12/2008 | Vance et al. | |
| 8,307,964 B2 | 11/2012 | De Kock | |
| 8,573,605 B2 * | 11/2013 | Di Maria ............. | F16F 9/5126 280/5.506 |
| 8,950,559 B2 | 2/2015 | De Kock | |
| 9,404,551 B2 | 8/2016 | Roessle et al. | |
| 9,500,255 B2 | 11/2016 | Nowaczyk et al. | |
| 9,797,466 B2 | 10/2017 | Kim et al. | |
| 9,856,940 B2 | 1/2018 | De Kock | |
| 9,982,739 B2 | 5/2018 | De Kock | |
| 10,113,604 B2 | 10/2018 | Ericksen et al. | |
| 2006/0011430 A1 | 1/2006 | Carlstedt et al. | |
| 2015/0377316 A1 | 12/2015 | Roessle et al. | |
| 2018/0156301 A1 | 6/2018 | De Kock | |
| 2018/0306266 A1 | 10/2018 | Knapczyk et al. | |
| 2018/0355945 A1 | 12/2018 | De Kock | |
| 2020/0355239 A1 * | 11/2020 | Wrzesinski, II ...... | F16F 9/3484 |

FOREIGN PATENT DOCUMENTS

| | | | | |
|---|---|---|---|---|
| CN | 104776146 A | 7/2015 | | |
| CN | 105492797 A | 4/2016 | | |
| CN | 107980084 | 5/2018 | | |
| CN | 108547906 A | 9/2018 | | |
| CN | 108884896 | 12/2018 | | |
| CN | 105102847 | 2/2019 | | |
| DE | 868393 C | 10/1953 | | |
| DE | 102016221980 | 5/2018 | | |
| DE | 102017206537 | 10/2018 | | |
| DE | 102016200935 | 11/2018 | | |
| EP | 3093521 A1 | 11/2016 | | |
| EP | 3392524 | 10/2018 | | |
| GB | 2072797 A | * | 10/1981 | ............... F16J 15/48 |
| JP | 2005201398 | 7/2005 | | |
| JP | 4958540 | 6/2012 | | |
| JP | 2018013208 | 1/2018 | | |
| JP | 2018109446 | 7/2018 | | |
| JP | 6456561 | 1/2019 | | |
| KR | 100618637 | 8/2006 | | |
| KR | 101671920 | 11/2016 | | |
| WO | 2006019492 | 2/2006 | | |
| WO | 2017125478 | 7/2017 | | |
| WO | 2018061726 | 1/2019 | | |
| WO | 2019003463 | 1/2019 | | |

OTHER PUBLICATIONS

Extended European Search Report dated Oct. 15, 2020 for counterpart European patent application No. 20172933.2.

* cited by examiner

DAMPER ASSEMBLY AND A PISTON FOR A DAMPER ASSEMBLY

CROSS-REFERENCE TO RELATED APPLICATIONS

This application claims the benefit of U.S. Provisional Application Patent Ser. No. 62/844,008, filed on May 6, 2019, and Chinese Patent Application Serial No. CN202010348682.0, filed on Apr. 28, 2020. The entire disclosures of which are incorporated herein by reference.

BACKGROUND OF THE INVENTION

1. Field of the Invention

The present invention generally relates to a damper assembly and a piston for the damper assembly.

2. Description of the Prior Art

Damper assemblies or shock absorbers are well known to help control the impact and rebound movement of a vehicle's spring and suspension. For example, along with smoothing out bumps and vibrations, the key role of the shock absorber is to ensure that the vehicle's tires remain in contact with the road surface at all times, which ensure the safest control and braking response from the vehicle. A conventional damper assembly includes a tubular housing extending between an opened end and a closed end and defining a fluid chamber for containing working fluid. A piston is slidably disposed in the fluid chamber and divides the working chamber into a compression chamber and a rebound chamber. A piston rod connects to the piston and extends outwardly from the tubular housing for moving the piston between a compression stroke and a rebound stroke. The piston has a first valving system incorporated therein for generating a damping force during the rebound stroke. The piston can also have a second valving system incorporated therein for generating a damper force during the compression stroke.

One such a hydraulic damper is disclosed in U.S. Pat. No. 9,500,255. The damper assembly includes a housing disposed on a center axis and extending between a first end and a second end. The housing defines a fluid chamber for containing a working fluid. A piston is slidably disposed in the fluid chamber dividing the fluid chamber into a compression chamber and a rebound chamber. A piston rod is disposed on the center axis and is attached to the piston for moving the piston between a compression stroke and a rebound stroke. An outer sleeve extends about the center axis and around the piston for sealing the compression chamber and the rebound chamber.

SUMMARY OF THE INVENTION

The present invention provides for a damper assembly having additional tuning parameters to improve ride comfort and vehicle balance due to effective sealing. In addition, the present invention provides reduced inertia for a smooth transition between compression and rebound strokes and reduce friction in the damper assembly for a smooth transition between compression and rebound strokes. Further, the present invention provides for an expansion valve that has a simple design and low cost in production.

It is one aspect of the present invention to provide a damper assembly comprising a housing disposed on a center axis. The housing defines a fluid chamber containing a working fluid. A piston is slidably disposed in the fluid chamber dividing the fluid chamber into a compression chamber and a rebound chamber. A piston rod is disposed on the center axis and attached to the piston for moving the piston between a compression stroke and a rebound stroke. The piston includes a first portion and a second portion, spaced from one another, defining a first perforation extending between the first portion and the second portion. An outer sleeve, having an exterior surface and an interior surface, extends about the center axis between the first portion and the second portion covering the first perforation. The piston includes a first entry valve and a second entry valve located in the piston and coupled to the piston for limiting the working fluid from flowing into the piston with the first entry valve being disposed adjacent the first portion and the second entry valve being disposed adjacent the second portion.

It is another aspect of the present invention to provide a piston for displacement in a damper assembly. The piston comprises a first portion and a second portion, spaced from one another, defining a first perforation extending between the first portion and the second portion for allowing a working fluid to flow through the piston during a compression stroke and a rebound stroke. A first entry valve and a second entry valve are respectively coupled to the first portion and the second portion to limit the working fluid from flowing into the piston. The first entry valve is disposed adjacent the first portion. The second entry valve is disposed adjacent the second portion. An outer sleeve, having an exterior surface and an interior surface, extends about the first portion and the second portion covering the first perforation. The outer sleeve defines an outer notch and a second perforation. The outer notch is located on the exterior surface and extends radially inward toward the center axis. The second perforation extends through the outer sleeve and is in fluid communication with the outer notch.

It is another aspect of the present invention to provide a piston for displacement in a damper assembly. The piston comprises a first portion and a second portion, spaced from one another, and defining a first perforation extending between the first portion and the second portion for allowing a working fluid to flow through the piston during a compression stroke and a rebound stroke. A first entry valve and a second entry valve are respectively coupled to the first portion and the second portion to limit the working fluid from flowing into the piston with the first entry valve disposed adjacent the first portion and the second entry valve disposed adjacent the second portion. An expansion valve is disposed between the first entry valve and the second entry valve for providing resistance to the first entry valve and the second entry valve. The expansion valve includes a body defining a first compartment and a second compartment, axially spaced from one another, for respectively receiving a first moving member and a second moving member whereby the first moving member and the second moving member are independently displaceable along the center axis. An outer sleeve, having an exterior surface and an interior surface, extends about first portion and the second portion covering the first perforation. The outer sleeve defines an outer notch and a second perforation. The outer notch is located on the exterior surface and extends radially inward toward the first portion and the second portion. The second perforation extends through the outer sleeve and is in fluid communication with the outer notch.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
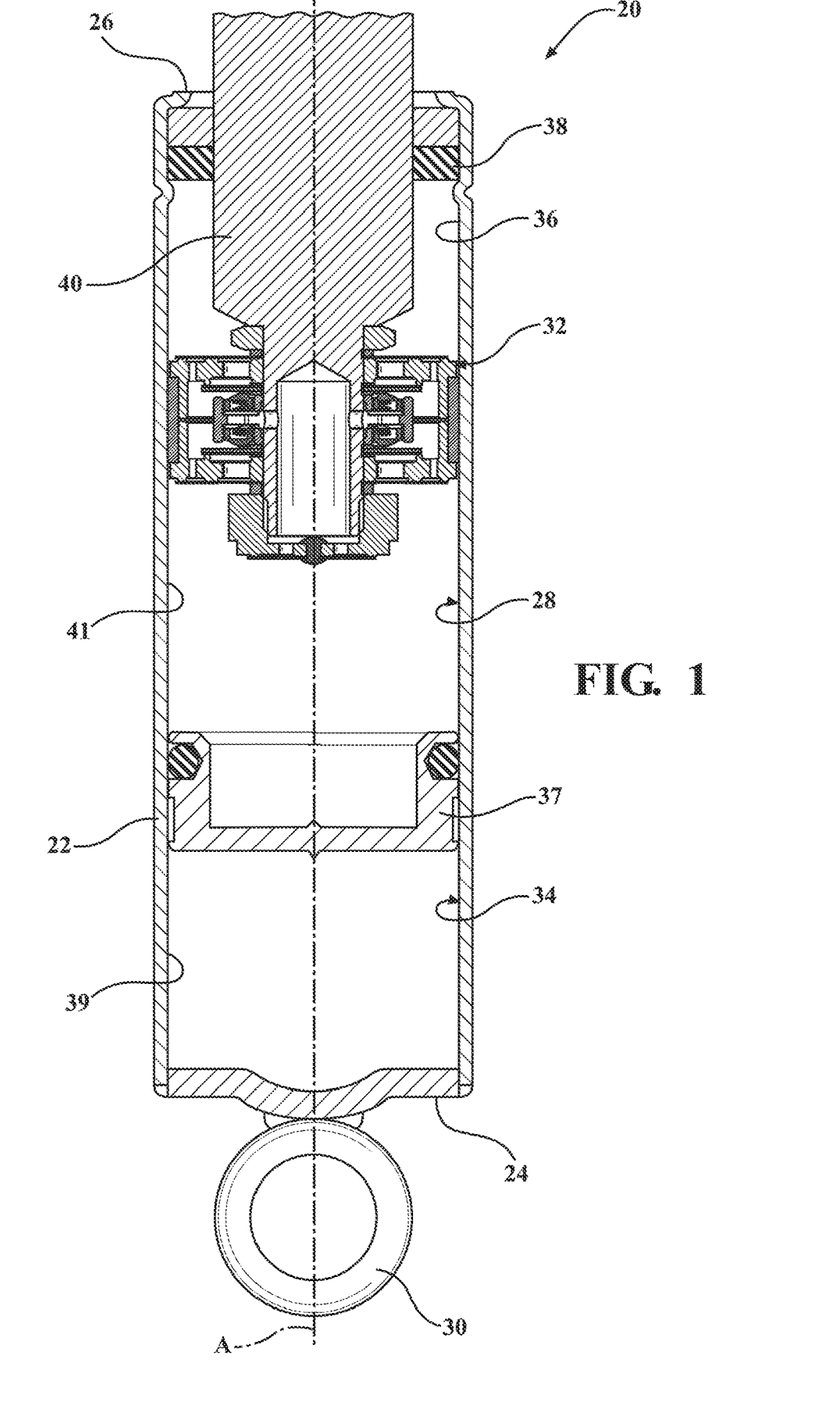
FIG. 1 is a cross-sectional view of a damper assembly constructed in accordance with one embodiment of the present invention.

Referring to the Figures, wherein like numerals indicate corresponding parts throughout the several views, a damper assembly 20 constructed in accordance with the enabling embodiment is generally shown in FIG. 1.

As best shown in FIG. 1, the damper assembly 20 comprises a housing 22, having a generally tubular shape, disposed annularly about a center axis A and extending between a first end 24 and a second end 26. The housing 22 defines a fluid chamber 28 extending between the first end 24 and the second end 26 for containing a working fluid. A mounting ring 30, having a generally circular shape, is disposed at the first end 24 of the housing 22 for attaching the housing 22 to the vehicle. A piston 32, having a generally cylindrical shape, is slidably disposed in the fluid chamber 28 and divides the fluid chamber 28 into a compression chamber 34 and a rebound chamber 36. The compression chamber 34 extends between the first end 24 and the piston 32. The rebound chamber 36 extends between the second end 26 and the piston 32. A gas cup 37, located in the compression chamber 34, divides the compression chamber 34 into a first chamber 39 and a second chamber 41. The first chamber 39 extends between the first end 24 and the gas cup 37 for containing a gas. The second chamber 41 extends between the gas cup 37 and the piston 32. A rod guide 38 is disposed in the rebound chamber 36 and attached to the second end 26 to close the fluid chamber 28. A piston rod 40 extends through the rod guide 38, along the center axis A, and attaches to the piston 32 for moving the piston 32 between a compression stroke and a rebound stroke. During the compression stroke, the piston 32 and the piston rod 40 moves in the fluid chamber 28 toward the first end 24 of the housing 22. During the rebound stroke, the piston 32 and the piston rod 40 moves in the fluid chamber toward the second end 26 of the housing 22. It should be appreciated that the gas cup 37 compensates for a difference in volume resulting from the position of the piston 32 and the piston rod 40.

Figure 2:
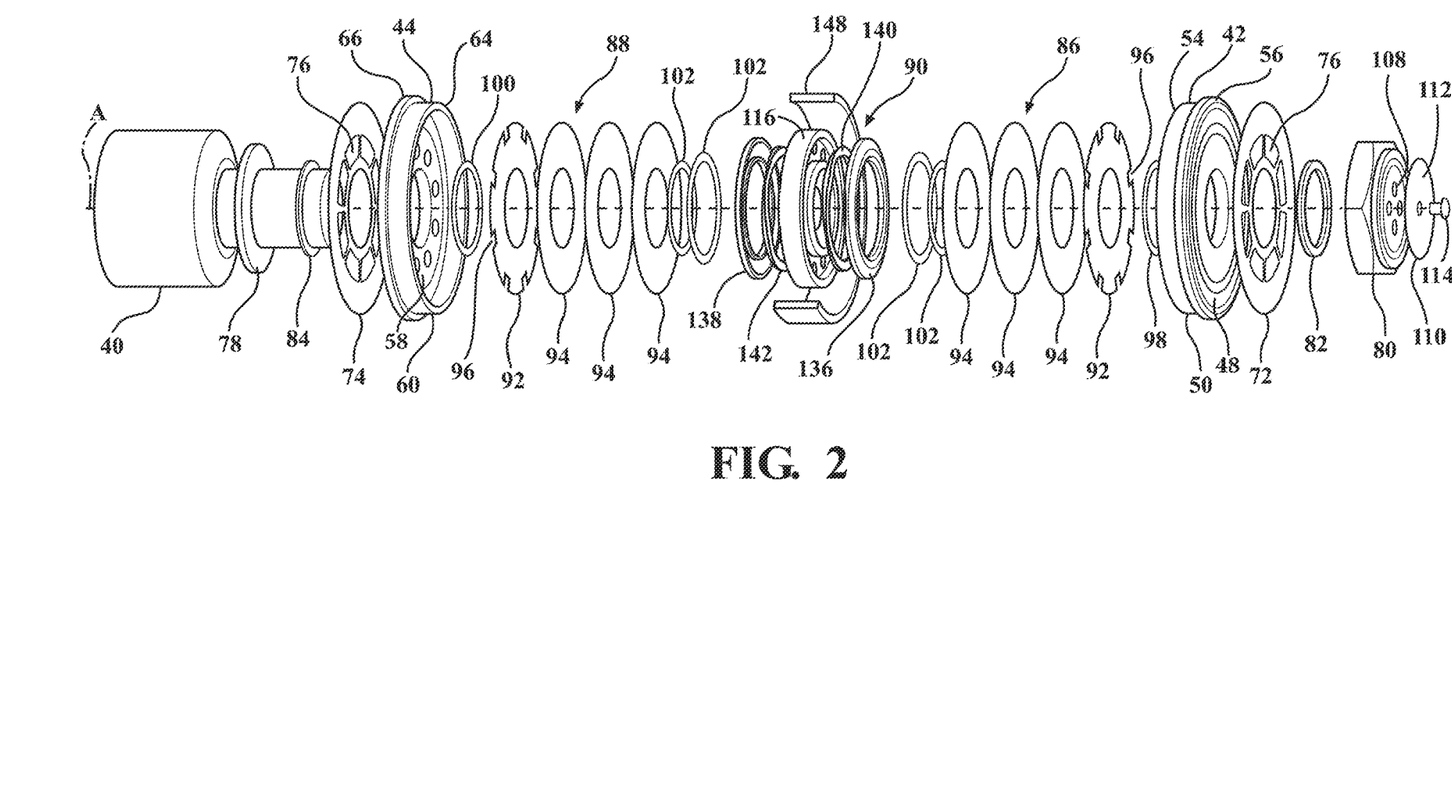
FIG. 2 is an exploded perspective view of a piston and a piston rod of the damper assembly.
Figure 3:
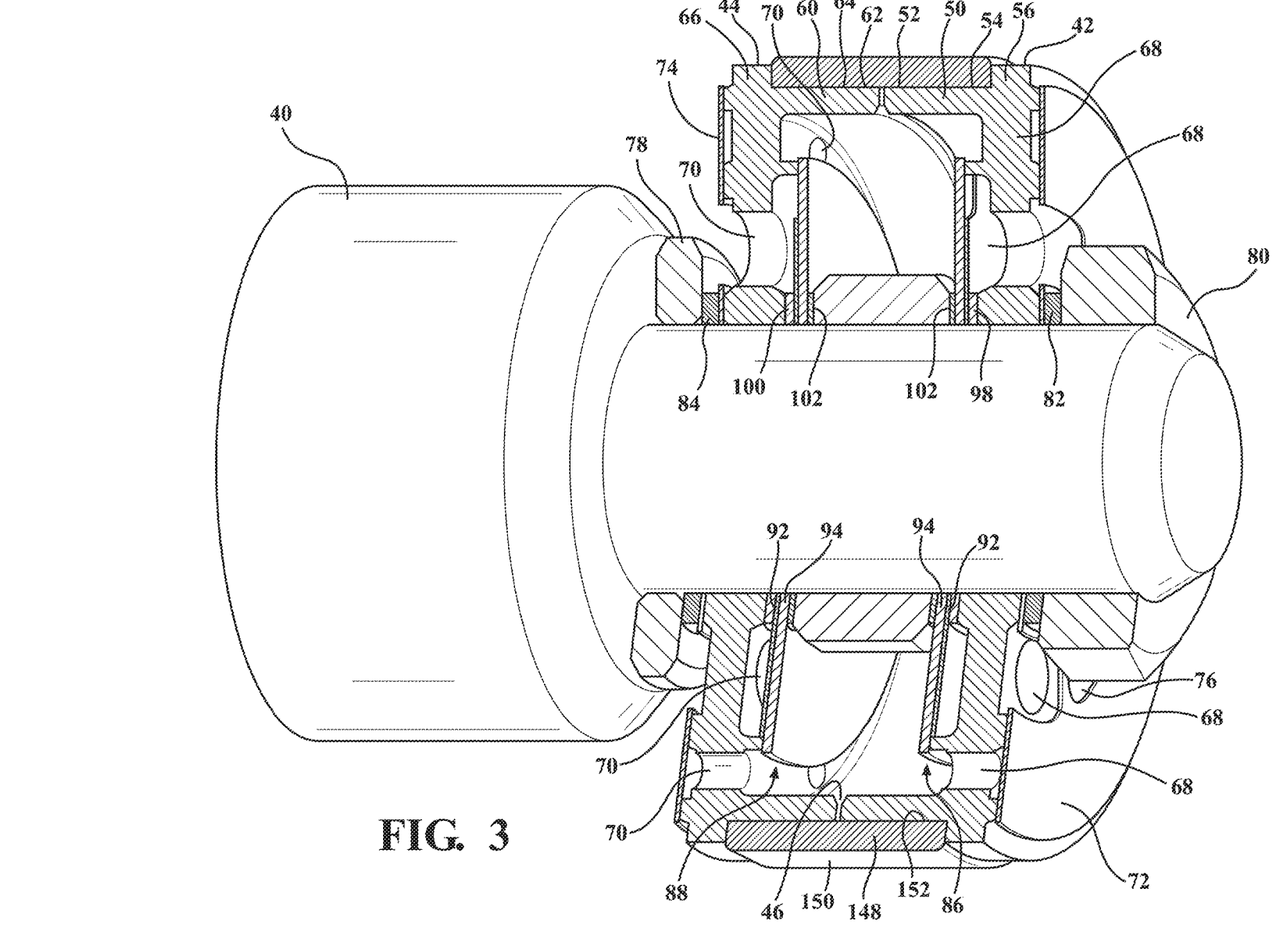
FIG. 3 is a fragmentary cross-sectional view of the piston and the piston rod.

As best illustrated in FIGS. 2 and 3, the piston 32 includes a first portion 42 and a second portion 44, each having a generally annular shape, axially spaced from one another to define a first perforation 46 extending between the first portion 42 and the second portion 44 for allowing the working fluid to flow through the piston 32 during the compression stroke and the rebound stroke. It should be appreciated that in one embodiment of the present invention, the first perforation 46 can be a groove extending about the center axis A. In another embodiment of the present invention, the first perforation 46 can be a plurality of holes disposed about the center axis A and circumferentially spaced from one another.

The first portion 42 includes a first disk 48, having a generally circular shape and disposed on the center axis A, and a first wall 50. The first wall 50, having a generally annular shape, extends annularly outwardly from the first disk 48 along the center axis A to a first distal end 52. The first wall 50 has a first periphery 54 extending annularly about the center axis A to the first distal end 52. The first disk 48 includes a first flange 56 extending radially outward from the first wall 50, in a perpendicular relationship with the center axis A, and annularly about the center axis A. The second portion 44 includes a second disk 58, having a generally circular shape and disposed on the center axis A, and a second wall 60. The second wall 60, having a generally annular shape, extends outwardly from the second disk 58 along the center axis A toward the first disk 48 to a second distal end 62 axially spaced from the first distal end 52 to define the first perforation 46 The second wall 60 has a second periphery 64 extending annularly about the center axis A to the second distal end 62. The second disk 58 includes a second flange 66 extending radially outward from the second wall 60, in a perpendicular relationship with the center axis A, and annularly about the center axis A.

The piston 32 defines a plurality of channels 68, 70 for allowing the working fluid to flow through the piston 32 during the compression stroke and the rebound stroke. The plurality of channels 68, 70 includes a set of first channels 68 disposed on the first disk 48 and a set of second channels 70 disposed on the second disk 58. A pair of primary check valves 72, 74, each having a circular shape and spaced from one another along the center axis A, is disposed adjacent the piston 32 for regulating the working fluid flowing through the piston 32. The pair of primary check valves 72, 74 includes a first primary check valve 72 disposed adjacent the first disk 48 and a second primary check valve 74 disposed adjacent the second disk 58. Each of the pair of primary check valves 72, 74 defines a plurality of primary apertures 76 for allowing the working fluid to flow into the piston 32 during the compression stroke or the rebound stroke. It should be appreciated that, in one embodiment of the present invention, the first primary check valve 72 is disposed adjacent to the first disk 48 and the primary apertures 76 of the first primary check valve 72 allows the working fluid to flow through the first disk 48 during the compression stroke. The second primary check valve 74 is disposed adjacent to the second disk 58 and the primary apertures 76 of the second primary check valve 74 allow the working fluid to flow through the second disk 58 during the rebound stroke.

A collar 78 and a nut 80, each having an annular shape and coupled to the piston rod 40, sandwich the pair of primary check valves 72, 74 and the piston 32 together. A plurality of exterior spacers 82, 84, each having a circular shape and spaced from one another, are disposed on the center axis A adjacent the pair of primary check valves 72, 74. The plurality of exterior spacers 82, 84 includes a first exterior spacer 82 disposed between the first primary check valve 72 and the nut 80 and a second exterior spacer 84 disposed between the second primary check valve 74 and the collar 78. In other words, the first primary check valve 72 is biased against the first disk 48 via the first exterior spacer 82 to restrict working fluid flow through the first disk 48 during the compression stroke to provide a damping force. The second primary check valve 74 is biased against the second disk 58 via the second exterior spacer 84 to restrict working fluid flow through the second disk 58 during the rebound stroke to provide a damping force.

According to an embodiment of the present invention, the piston 32 includes a pair of entry valves 86, 88 and an expansion valve 90, disposed radially inward from the first wall 50 and the second wall 60. The expansion valve 90 is disposed between the pair of entry valves 86, 88 for providing resistance to the pair of entry valves 86, 88. With the expansion valve 90 being disposed between the entry valves 86, 88, i.e. incorporated in the piston 32, the length of the piston 32 as well as the dimension of the damper assembly 20 is not affected. In addition, components of the expansion valve 90 allow for independent tuning of the damper assembly 20 for improving ride comfort and vehicle handling.

The pair of entry valves 86, 88 includes a first entry valve 86 and a second entry valve 88. The first entry valve 86 is disposed between the first portion 42 and the second portion 44 adjacent the first disk 48 allowing the working fluid to flow into the piston 32 during the compression stroke. The second entry valve 88 is disposed between the first portion 42 and the second portion 44 adjacent the second disk 58 allowing the working fluid to flow into the piston 32 during the rebound stroke. The first entry valve 86 and the second entry valve 88 each include an orifice disk 92 and at least one compression disk 94, each having a circular shape and extending about the center axis A. The at least one compression disk 94 is disposed adjacent the orifice disk 92 for providing rigidity to the orifice disk 92. The orifice disk 92 is disposed between the piston 32, e.g. the first portion 42 or the second portion 44 of the piston 32, and the at least one compression disk 94. The orifice disk 92 defines a plurality of orifices 96 disposed about a perimeter of the orifice disk 92 and circumferentially spaced from one another. The orifices 96 extend radially inwardly toward the center axis A for allowing the working fluid to flow through the piston 32. A plurality of interior spacers 98, 100, 102, each having a circular shape and spaced from one another, is disposed on the center axis A adjacent the pair of primary check valves 72, 74. The plurality of interior spacers 98, 100, 102 includes a first interior spacer 98 and a second interior spacer 100. The first interior spacer 98 is disposed between the first disk 48 and the first entry valve 86. The second interior spacer 100 is disposed between the second disk 58 and the second entry valve 88. Further, the plurality of interior spacers 98, 100, 102 includes a set of third interior spacers 102 disposed between the expansion valve 90 and the pair of entry valves 86, 88. This arrangement of the entry valves 86, 88 provides the possibility to use the same type of discs on a rebound side and a compression side. Moreover this type of valve architecture provides the possibility to use additional systems having additional tuning parameters to improve ride comfort and vehicle balance due to effective sealing. It should be appreciated that the performance of the piston 32 can be fine-tuned by varying the diameters of the interior spacers 98, 100, 102.

Figure 4:
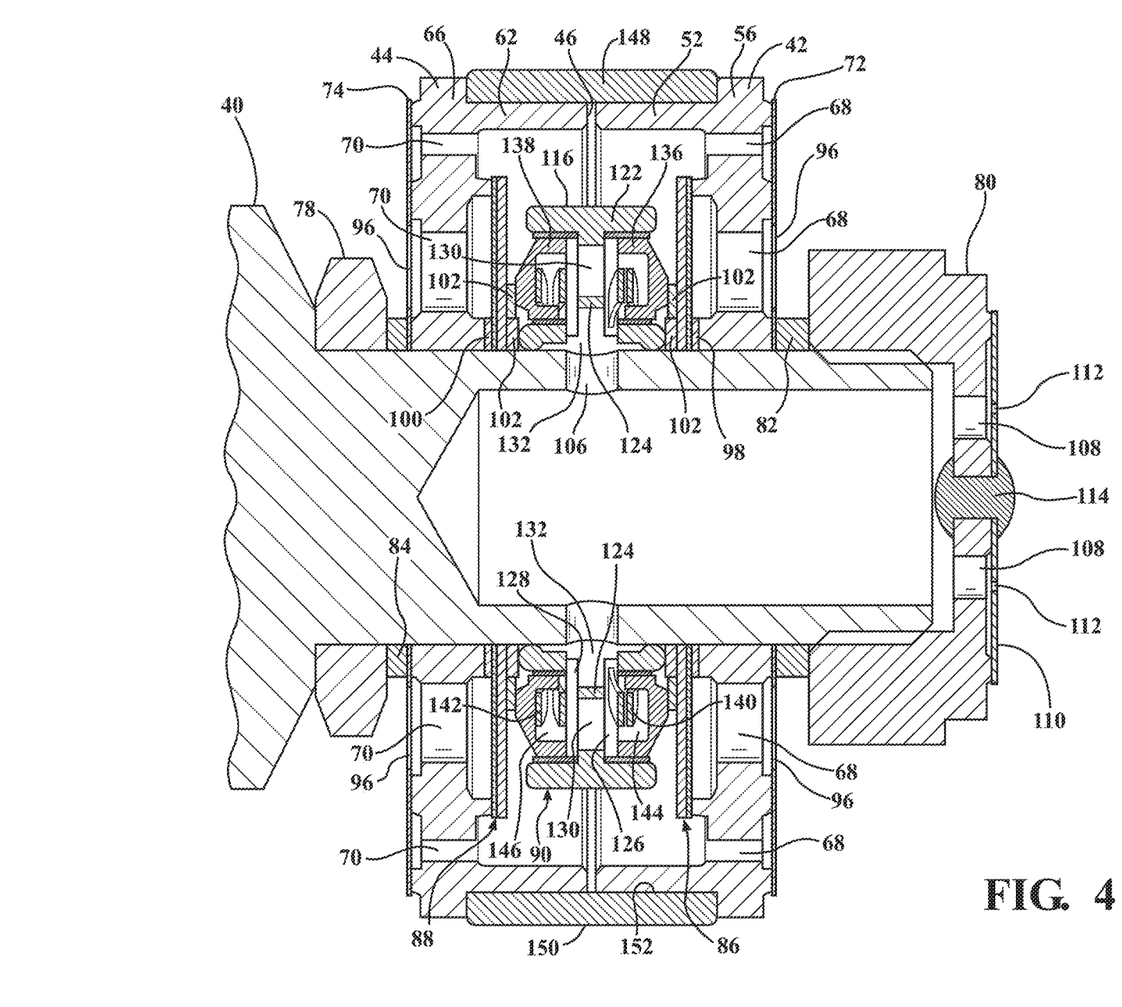
FIG. 4 is a cross-sectional view of the piston and the piston rod constructed in accordance with one embodiment of the present invention.
Figure 5:
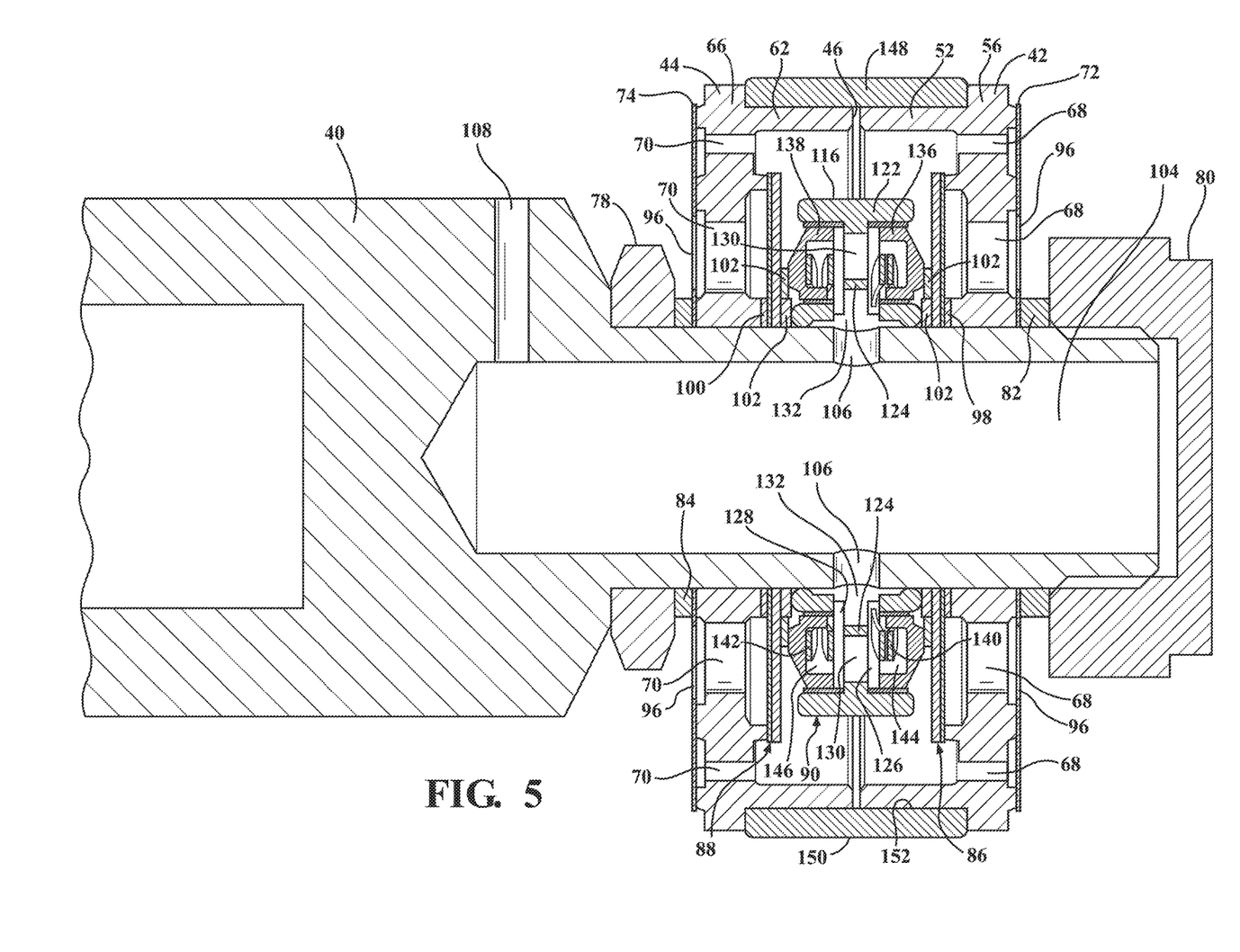
FIG. 5 is a cross-sectional view of the piston and the piston rod constructed in accordance with another embodiment of the present invention.

As illustrated in FIGS. 4 and 5, the piston rod 40 defines a first bore 104 and a plurality of second bores 106 for allowing the working fluid to flow into and out of the expansion valve 90. The first bore 104 extends along the center axis A toward the compression chamber 34 for allowing the working fluid to flow through the piston rod 40. The plurality of second bores 106 are disposed about the piston rod 40 with each one of the second bores 106 extending radially outward from the first bore 104 toward the expansion valve 90 for allowing working fluid to flow between the expansion valve 90 and the compression chamber 34. The nut 80 defines a plurality of auxiliary bores 108, disposed about the center axis A and spaced circumferentially from one another about the center axis A, allowing the compression chamber 34 to be in fluid communication with the expansion valve 90. In another embodiment of the present invention, as best illustrated in FIG. 5, the first bore 104 extends toward the rebound chamber 36 and the piston rod 40 defines the plurality of auxiliary bores 108 to extend between the rebound chamber 36 and the first bore 104. In this embodiment, the rebound chamber 36 is in fluid communication with the expansion valve 90.

An auxiliary check valve 110, having a circular shape, is disposed on the center axis A and adjacent the nut 80 to cover the plurality of auxiliary bores 108. The auxiliary check valve 110 defines an auxiliary aperture 112 for allowing the working fluid to flow between the compression chamber 34 and the auxiliary bores 108. A securing member 114, having a tubular shape, extends along the center axis A and engages the auxiliary check valve 110 to connect the auxiliary check valve 110 to the nut 80. It should be appreciated that the performance of the piston 32 can be fine-tuned by changing the diameter of the auxiliary bores 108 and/or the auxiliary aperture 112.

Figure 6:
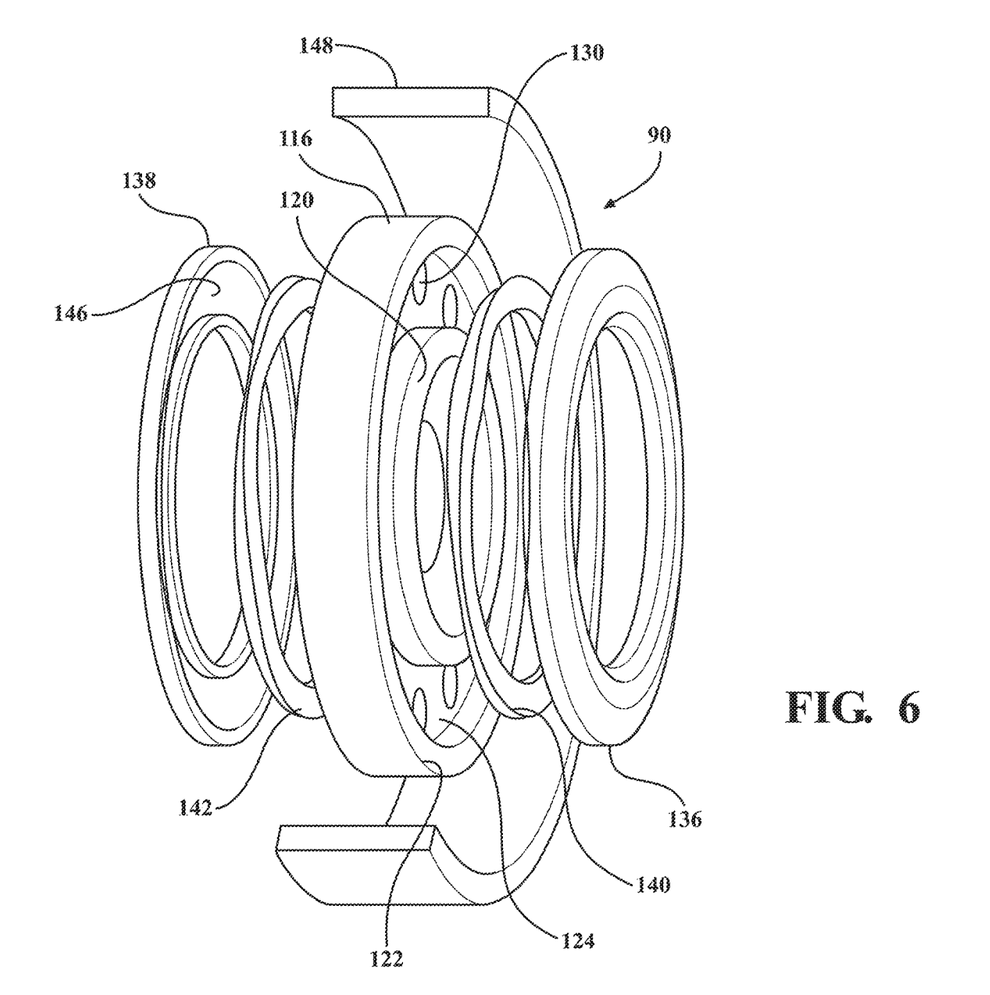
FIG. 6 is an enlarged perspective view of an expansion valve for the piston.

As best shown in FIGS. 4 and 6, the expansion valve 90 includes a body 116 having an inner band 120 and an outer band 122 disposed concentric to and radially spaced from one another. An intermediate portion 124 extends between the inner band 120 and the outer band 122 connecting the inner band 120 and the outer band 122. The body 116 defines a first compartment 126 and a second compartment 128 axially spaced from another between the inner band 120, the outer band 122, and the intermediate portion 124. The intermediate portion 124 also defines a plurality of passages 130 disposed about the center axis A, spaced circumferentially from one another, to allow working fluid to flow between the first compartment 126 and the second compartment 128. The inner band 120 defines a plurality of slots 132 disposed about the center axis A, radially spaced from the passages 130 and circumferentially spaced from one another, in fluid communication with the first compartment 126 and the second compartment 128. A plurality of arches extends radially outward between the inner band 120 and the intermediate portion 124 adjacent the plurality of slots 132 to connect the inner band 120 to the intermediate portion 124.

A first moving member 136 and a second moving member 138, each having an annular shape, are disposed in the first compartment 126 and the second compartment 128, respectively. A first elastic member 140 extends between the first moving member 136 and the body 116 to bias the first moving member 136 against the first entry valve 86. A second elastic member 142 extends between the second moving member 138 and the body 116 to bias the second moving member 138 against the second entry valve 88. The first moving member 136 defines a first receptacle 144 for receiving the first elastic member 140 and secures the first elastic member 140 along the center axis A. The second moving member 138 defines a second receptacle 146 for receiving the second elastic member 142 and secures the second elastic member 142 along the center axis A. As best shown in FIGS. 4 and 5, the spacing between the first moving member 136 and the second moving member 138 is disposed in fluid communication with the compression chamber 34 and/or the rebound chamber 36 through the first bore 104 and the second bore 106. With dynamic changes in the velocity of the piston, the fluid pressures in the compression chamber 34 and the rebound chamber 36 vary as well. Accordingly, the fluid pressure in the spacing between the first moving member 136 and the second moving member 138 also changes. Due to the change in fluid pressure in the spacing between the first moving member 136 and the second moving member 138, the stiffness of the first entry valve 86 and the second entry valve 88 also changes. This feature provides additional tuning parameters for the damper assembly 20 to improve ride comfort and vehicle control. Although the Figures only show a mono-tube damper, it should be appreciated that this feature can also be used in connection with a twin-tube damper.

Figure 7:
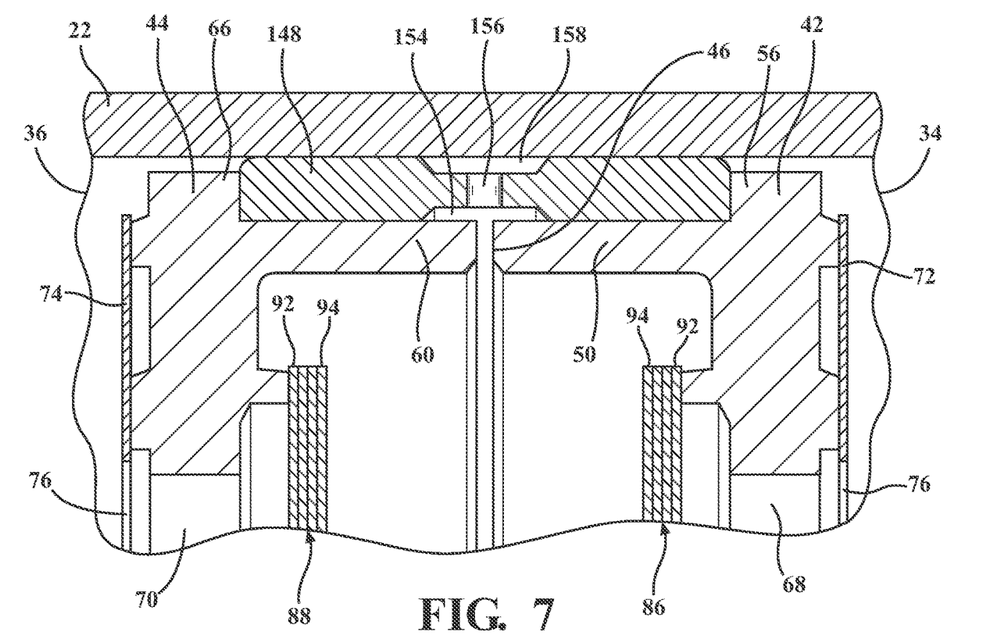
FIG. 7 is an enlarged cross-sectional view of the piston and the outer sleeve constructed in accordance with one embodiment of the present invention.
Figure 8:
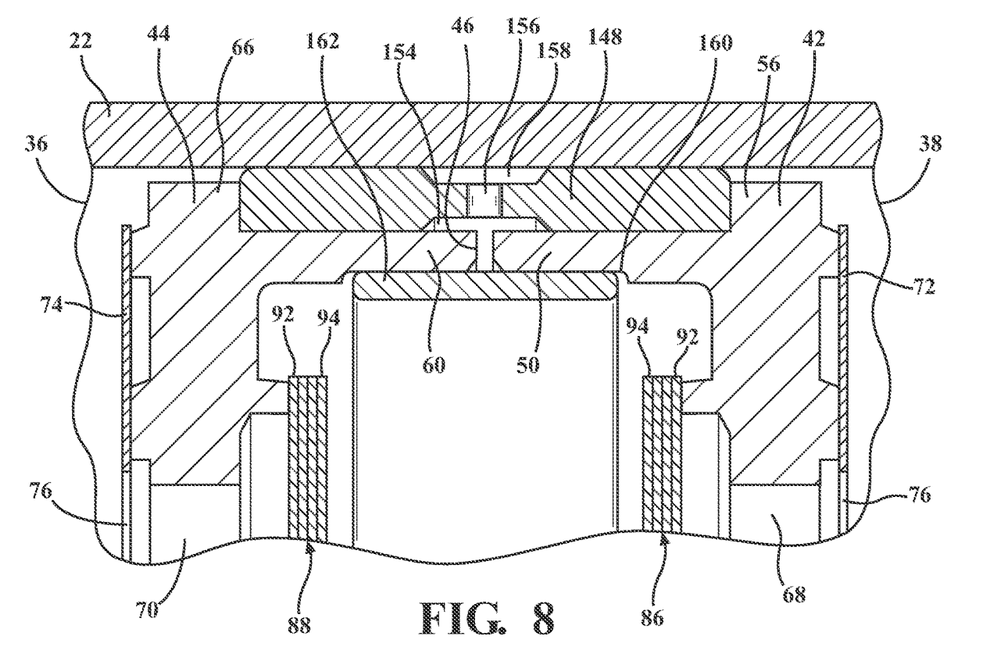
FIG. 8 is an enlarged cross-sectional view of the piston and the outer sleeve constructed in accordance with another embodiment of the present invention.

It should be appreciated that the presence of the perforation 46 by itself is undesirable due to the possibility of uncontrolled leakages. According to an embodiment of the present invention, as best illustrated in FIGS. 7 and 8, an outer sleeve 148, having a generally circular shape, extends about the center axis A between the first portion 42 and the second portion 44 covering the first perforation 46. The outer sleeve 148 has an exterior surface 150 and an interior surface 152 extending annularly about the center axis A. The outer sleeve 148 defines an inner notch 154, a second perforation 156, and an outer notch 158. The inner notch 154 is located on the interior surface 152 and extends radially outwardly from the center axis A. The outer notch 158 is located on the exterior surface 150 and extends radially inward toward the center axis A. In other words, the outer notch 158 and the inner notch 154 are located on the outer sleeve 148 and extend toward one another. The second perforation 156 extends through the outer sleeve 148 and is in fluid communication with the outer notch 158 and the inner notch 154 thereby allowing fluid communication between the outer notch 158, the inner notch 154, and the second perforation 156. This arrangement allows working fluid to flow between the outer sleeve 148 and the housing 22 during the compression stroke and the rebound stroke. Accordingly, the working fluid between the outer sleeve 148 and the housing 22 provides lubrication to the piston 32 and the housing 22 thereby reducing the friction between the piston 32 and the housing 22. According to an embodiment of the present invention, an indentation 160 extends radially outward from the center axis A between the first wall 50 and the second wall 60 and along the center axis A adjacent the first perforation 46. An inner sleeve 162 extends about the center axis A in the indentation 160 to avoid the working fluid from flowing through the first perforation 46.

In operation, during the compression stroke, as the piston rod 40 and the main piston 32 advance toward the first end 24, the working fluid flows from the compression chamber 34 to the rebound chamber 36 through the piston 32, the first entry valve 86, and the second orifice disk 92. The working fluid also flows through the auxiliary aperture 112 and piston rod 40 into the first compartment 126 and the second compartment 128. During a low acceleration compression stroke, the fluid pressure differential between the compression chamber 34 and the spacing between the first moving member 136 and the second moving member 138 is negligible. Thus, the first moving member 136 and the second moving member 138 are pushed axially away from one another, by the elastic members 140, 142, against the first entry valve 86 and the second entry valve 88, respectively, to increase the stiffness of the first entry valve 86 and the second entry valve 88 thereby preventing the first entry valve 86 from deflecting toward the rebound chamber 36. During a high acceleration compression stroke, the fluid pressure in the compression chamber 34 increases faster than the fluid pressure in the spacing between the first moving member 136 and the second moving member 138. Accordingly, this reduces the forces that bias the first moving member 136 against the first entry valve 86 and the second moving member 138 against the second entry valve 88 to allow the first entry valve 86 to deflect toward the rebound chamber 36 thereby pushing the first moving member 136 toward the second moving member 138, causing the working fluid to flow through the auxiliary check valve 110 into the compression chamber 34.

During the rebound stroke, as the piston rod 40 and the main piston 32 advance toward the second end 26, the working fluid flows from the rebound chamber 36 to the compression chamber 34 through the piston 32, the second entry valve 88, and the first orifice disk 92. The working fluid also flows through the auxiliary aperture 112 and piston rod 40 and into the first compartment 126 and the second compartment 128. During a low acceleration rebound stroke, the fluid pressure differential between the rebound chamber 36 and the spacing between the first moving member 136 and the second moving member 138 is negligible. Thus, the first moving member 136 and the second moving member 138 are pushed away from one another, by the elastic members 140, 142, against the first entry valve 86 and the second entry valve 88, respectively, to increase the stiffness of the first entry valve 86 and the second entry valve 88 thereby preventing the second entry valve 88 from deflecting toward the compression chamber 34. During a high acceleration rebound stroke, the fluid pressure in the rebound chamber 36 increases faster than the fluid pressure in the spacing between the first moving member 136 and the second moving member 138. Accordingly, this reduces the forces that bias the first moving member 136 against the first entry valve 86 and the second moving member 138 against the second entry valve 88 to allow the second entry valve 88 to deflect toward the compression chamber 34 and push the second moving member 138 toward the first moving member 136, causing the working fluid to flow through the auxiliary check valve 110 into the compression chamber 34.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:
1. A damper assembly comprising:
a housing disposed on a center axis defining a fluid chamber for containing a working fluid;
a piston slidably disposed in said fluid chamber dividing said fluid chamber into a compression chamber and a rebound chamber;
a piston rod disposed on said center axis and attached to said piston for moving said piston between a compression stroke and a rebound stroke;
said piston including a first portion and a second portion, said first portion and said second portion being spaced from one another and defining a first perforation extending between said first portion and said second portion;

an outer sleeve having an exterior surface and an interior surface extending about said center axis between said first portion and said second portion covering said first perforation;

said outer sleeve defining an outer notch and a second perforation with said outer notch located on said exterior surface and extending radially inward toward said center axis and said second perforation extending through said outer sleeve and in fluid communication with said outer notch;

said outer sleeve defines an inner notch located on said interior surface and in fluid communication with said second perforation; and said piston including a first entry valve and a second entry valve located in said piston and coupled to said piston for limiting the working fluid from flowing into said piston with said first entry valve being disposed adjacent said first portion and said second entry valve being disposed adjacent said second portion.

2. The damper assembly as set forth in claim 1, wherein said piston defines an indentation extending radially outward from said center axis between said first portion and said second portion, adjacent said first perforation, for receiving an inner sleeve extending about said center axis to avoid the working fluid from flowing through said first perforation.

3. The damper assembly as set forth in claim 1, further including an expansion valve disposed between said first entry valve and said second entry valve providing resistance to said first entry valve and said second entry valve; and said expansion valve including a body defining a first compartment and a second compartment axially spaced from one another for respectively receiving a first moving member and a second moving member whereby said first moving member and said second moving member are independently displaceable along said center axis.

4. The damper assembly as set forth in claim 3, wherein said body includes an inner band and an outer band disposed concentric to and spaced radially from one another;

an intermediate portion connecting said inner band with said outer band and defining said first compartment and said second compartment between said inner band, said outer band, and said intermediate portion; and a first elastic member extending between said first moving member and said body to bias said first moving member against said first entry valve and a second elastic member extending between said second moving member and said body to bias said second moving member against said second entry valve.

5. The damper assembly as set forth in claim 4, wherein said inner band defines a plurality of slots disposed about said center axis, circumferentially spaced from one another, and in fluid communication with said first compartment and said second compartment; and said intermediate portion defines a plurality of passages disposed about said center axis, radially spaced from said slots, and circumferentially spaced from one another to allow working fluid to flow between said first compartment and said second compartment.

6. A piston for displacement in a damper assembly, said piston comprising:

a first portion and a second portion, said first portion and said second portion being spaced from one another and defining a first perforation extending between said first portion and said second portion for allowing a working fluid to flow through said piston during a compression stroke and a rebound stroke;

a first entry valve and a second entry valve respectively coupled to said first portion and said second portion for limiting the working fluid from flowing into said piston with said first entry valve being disposed adjacent said first portion and said second entry valve being disposed adjacent said second portion;

an outer sleeve having an exterior surface and an interior surface extending about said first portion and said second portion covering said first perforation;

said outer sleeve defining an outer notch and a second perforation with said outer notch located on said exterior surface and extending radially inward toward said first portion and said second portion and said second perforation extending through said outer sleeve and in fluid communication with said outer notch; and said outer sleeve defines an inner notch located on said interior surface and in fluid communication with said second perforation.

7. The piston as set forth in claim 6, wherein said piston defines an indentation extending between said first portion and said second portion adjacent said first perforation for receiving an inner sleeve extending limit the working fluid from flowing through said first perforation.

8. The piston as set forth in claim 6 including an expansion valve disposed between said first entry valve and said second entry valve for providing resistance to said first entry valve and said second entry valve; and said expansion valve including a body defining a first compartment and a second compartment axially spaced from one another for respectfully receiving a first moving member and a second moving member whereby said first moving member and said second moving member are independently displaceable.

9. The piston as set forth in claim 8, wherein said body includes an inner band and an outer band disposed concentric to and spaced radially from one another; and an intermediate portion connecting said inner band with said outer band and defining said first compartment and said second compartment between said inner band, said outer band, and said intermediate portion.

10. The piston as set forth in claim 8 including a first elastic member extending between said first moving member and said body to bias said first moving member against said first entry valve and a second elastic member extending between said second moving member and said body to bias said second moving member against said second entry valve.

11. The piston as set forth in claim 9, wherein said inner band defines a plurality of slots, circumferentially spaced from one another, and in fluid communication with said first compartment and said second compartment; and said intermediate portion defines a plurality of passages, radially spaced from said slots, and circumferentially spaced from one another to allow working fluid to flow between said first compartment and said second compartment.

12. A piston for displacement in a damper assembly, said piston comprising:

a first portion and a second portion, said first portion and said second portion being spaced from one another and defining a first perforation extending between said first portion and said second portion for allowing a working fluid to flow through said piston during a compression stroke and a rebound stroke;

a first entry valve and a second entry valve respectively coupled to said first portion and said second portion for limiting the working fluid from flowing into said piston with said first entry valve being disposed adjacent said first portion and said second entry valve being disposed adjacent said second portion;

an expansion valve disposed between said first entry valve and said second entry valve providing resistance to said first entry valve and said second entry valve;

said expansion valve including a body defining a first compartment and a second compartment axially spaced from one another for respectfully receiving a first moving member and a second moving member whereby said first moving member and said second moving member are independently displaceable;

an outer sleeve having an exterior surface and an interior surface extending about said first portion and said second portion covering said first perforation; and said outer sleeve defining an outer notch and a second perforation with said outer notch located on said exterior surface and extending radially inwardly and said second perforation extending through said outer sleeve and in fluid communication with said outer notch.

13. The piston as set forth in claim 12, wherein said outer sleeve defines an inner notch located on said interior surface and in fluid communication with said second perforation.

14. The piston as set forth in claim 12, wherein said first portion and said second portion define an indentation extending between said first portion and said second portion and adjacent said first perforation for receiving an inner sleeve to limit the working fluid from flowing through said first perforation.

15. The piston as set forth in claim 12, wherein said body includes an inner band and an outer band disposed concentric to and spaced radially from one another; and an intermediate portion extending connecting said inner band with said outer band and defining said first compartment and said second compartment between said inner band, said outer band, and said intermediate portion.

16. The piston as set forth in claim 15, wherein said inner band defines a plurality of slots, circumferentially spaced from one another, and in fluid communication with said first compartment and said second compartment.

17. The piston as set forth in claim 16, wherein said intermediate portion defines a plurality of passages, radially spaced from said slots, and circumferentially spaced from one another to allow working fluid to flow between said first compartment and said second compartment.

18. The piston as set forth in claim 12 including a first elastic member extending between said first moving member and said body to bias said first moving member against said first entry valve and a second elastic member extending between said second moving member and said body to bias said second moving member against said second entry valve.

* * * * *